United States Patent
Yang et al.

(10) Patent No.: US 11,252,340 B1
(45) Date of Patent: Feb. 15, 2022

(54) MOTION DETECTION SYSTEM WITH FLICKER COMPENSATION

(71) Applicant: Himax Imaging Limited, Tainan (TW)

(72) Inventors: Wei-Chieh Yang, Tainan (TW);
Po-Chang Chen, Tainan (TW);
Po-Fang Chen, Tainan (TW)

(73) Assignee: Himax Imaging Limited, Tainan (TW)

( * ) Notice: Subject to any disclaimer, the term of this patent is extended or adjusted under 35 U.S.C. 154(b) by 0 days.

(21) Appl. No.: 17/187,520

(22) Filed: Feb. 26, 2021

(51) Int. Cl.
*H04N 5/235* (2006.01)
*H04N 5/232* (2006.01)

(52) U.S. Cl.
CPC ......... *H04N 5/2357* (2013.01); *H04N 5/2351* (2013.01); *H04N 5/2353* (2013.01); *H04N 5/23232* (2013.01)

(58) Field of Classification Search
CPC .............. H04N 5/2357; H04N 5/2351; H04N 5/23232; H04N 5/2353
See application file for complete search history.

(56) References Cited

U.S. PATENT DOCUMENTS

2019/0297295 A1* 9/2019 Roberts .............. H04N 5/37455

\* cited by examiner

*Primary Examiner* — Twyler L Haskins
*Assistant Examiner* — Angel L Garces-Rivera
(74) *Attorney, Agent, or Firm* — Donald E. Stout; Stout, Uxa & Buyan, LLP

(57) ABSTRACT

A motion detection system with flicker compensation includes an image sensor that captures a first image for motion detection and a second image for flicker detection, the second image having a resolution lower than the first image; a controller that controls the image sensor to output either the first image or the second image; a motion detection device that receives first images and performs motion detection on the first images; and a flicker detection device that receives second images and performs flicker detection on the second images to generate a time offset, which is fed to the controller to update a wakeup cycle for coordinating the image sensor.

11 Claims, 7 Drawing Sheets

MOTION DETECTION SYSTEM WITH FLICKER COMPENSATION

BACKGROUND OF THE INVENTION

1. Field of the Invention

The present invention generally relates to motion detection, and more particularly to a motion detection system with flicker compensation.

2. Description of Related Art

Sensors, such as passive infrared sensors and image sensors, are commonly used as motion detectors for detecting object motion. For example, in a security camera system, motion detectors may trigger the security camera and capture high-resolution video when an object (e.g., person) is detected. In another example, motion detectors may activate light sources in an illumination system when human presence is detected.

The image sensors are commonly installed at particular locations in order to fulfill the sensing function. For installation simplicity, the motion detectors are powered by battery instead of mains electricity. Accordingly, power consumption becomes critical for lengthening operation lifetime of the motion detectors in a low-power motion detection system, which should stay always-on for monitoring.

In order to reduce power consumption in an image sensor based low-power motion detection system, lower resolution image or lower frame rate may be used. US 2004/0212678 entitled "Low power motion detection system," contents of which are incorporated herein by reference, discloses a motion detection system, in which image sensor is operated in mode of automatic wakeup and sleep. Specifically, the system periodically exits from a low power sleep state to capture an image for motion detection.

Motion detection is commonly performed by computing difference (or change) between a currently captured frame and a previously captured frame. Motion is detected if the difference is greater than a threshold level.

However, flicker banding artifact, which is the pulsating or fluctuating light phenomenon of artificial light sources, may ordinarily be generated, particularly indoors, when the scene captured by the image sensor is illuminated by artificial light sources with flicker characteristics. FIG. 1A shows exemplary timing diagrams illustrating brightness of lighting, image sensor and flicker component for a single frame.

Unfortunately, the flicker banding can be incorrectly detected as object motion as false alarm. FIG. 1B shows moving flicker banding (i.e., change of flicker banding) among multiple frames which may be incorrectly detected as object motion. Therefore, flicker detection and compensation scheme is needed to avoid this false alarm.

US 2020/0154031 entitled "APPARATUS," contents of which are incorporated herein by reference, discloses a flicker detection scheme specifically for photography, in which multiple frames are captured for flicker detection before continuous shooting is started.

U.S. Pat. No. 9,906,731 entitled "Imaging apparatus, method for controlling the same, and storage medium," contents of which are incorporated herein by reference, discloses a flicker compensation scheme specifically for photography, in which multiple frames are captured to determine a waiting time to synchronize exposure time with peak timing of illumination flicker, thereby maximizing light amount collected.

U.S. Pat. No. 8,102,437 entitled "Image sensing apparatus and control method therefor wherein the frame rate during autofocus is adjusted according to a detected flicker," contents of which are incorporated herein by reference, discloses a flicker detection scheme specifically for photography that sets the frame rate to a value that is synchronized with a frequency of the detected flicker, thereby preventing moving flicker banding. However, the moving flicker banding may still occur when the flicker frequency deviates.

JP 5067174 entitled "MOTION DETECTING DEVICE," contents of which are incorporated herein by reference, discloses a flicker compensation scheme by adaptive motion detection threshold, however, at the cost of lower detection sensitivity.

A need has thus arisen to propose a novel flicker detection and compensation scheme to overcome drawbacks of conventional systems.

SUMMARY OF THE INVENTION

In view of the foregoing, it is an object of the embodiment of the present invention to provide a low-power motion detection system with flicker compensation capable of avoiding flicker induced false alarm while keeping low power consumption and motion detection sensitivity.

According to one embodiment, motion detection system with flicker compensation includes an image sensor, a controller, a motion detection device and a flicker detection device. The image sensor captures a first image for motion detection and a second image for flicker detection, the second image having a resolution lower than the first image. The controller controls the image sensor to output either the first image or the second image. The motion detection device receives first images and performs motion detection on the first images. The flicker detection device receives second images and performs flicker detection on the second images to generate a time offset, which is fed to the controller to update a wakeup cycle for coordinating the image sensor.

DETAILED DESCRIPTION OF THE INVENTION

Figure 1A:
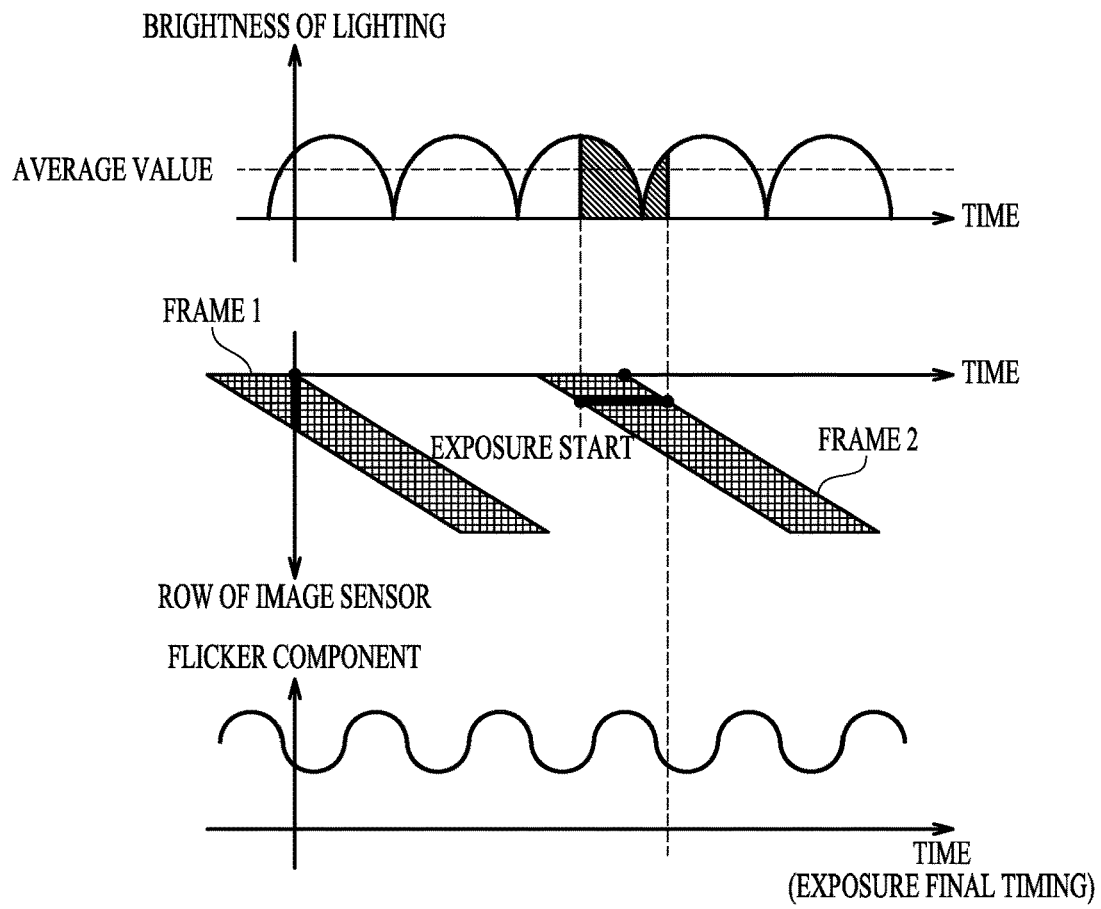
FIG. 1A shows exemplary timing diagrams illustrating brightness of lighting, image sensor and flicker component for a single frame.
Figure 1B:
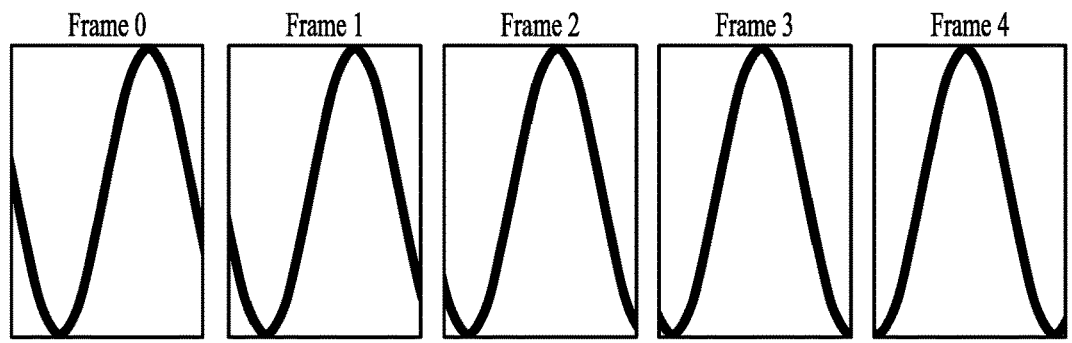
FIG. 1B shows moving flicker banding among multiple frames.
Figure 2:
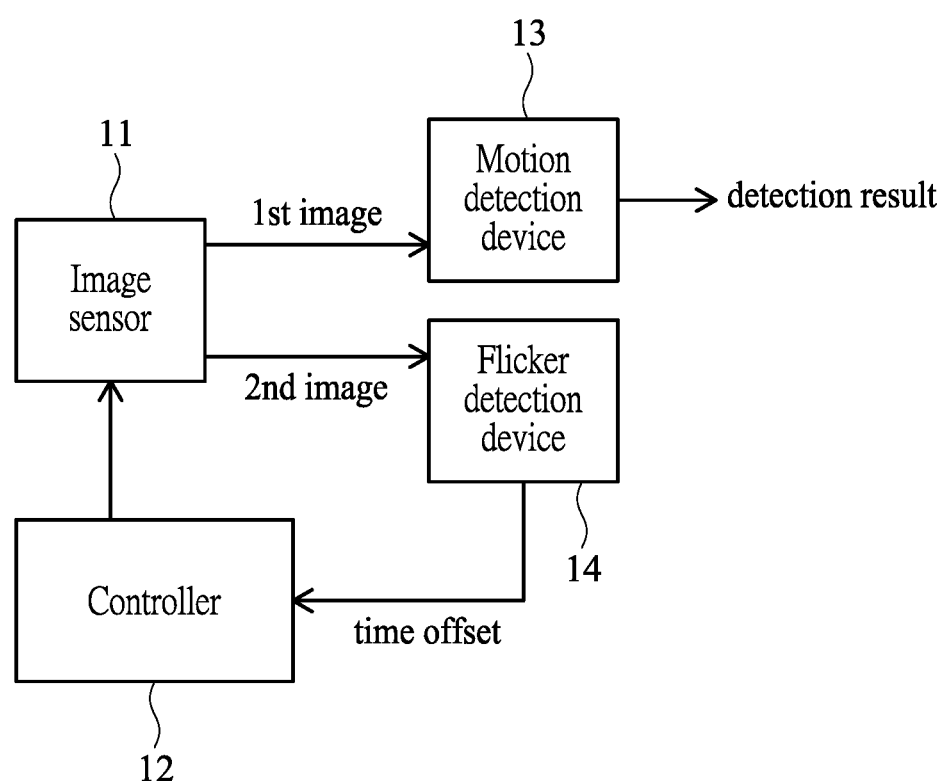
FIG. 2 shows a block diagram illustrating a motion detection system with flicker compensation according to a first embodiment of the present invention.

FIG. 2 shows a block diagram illustrating a motion detection system 100A with flicker compensation according to a first embodiment of the present invention. Some blocks of the motion detection system 100A may be performed by hardware, software or their combinations (e.g., performed in a digital image processor).

Figure 3:
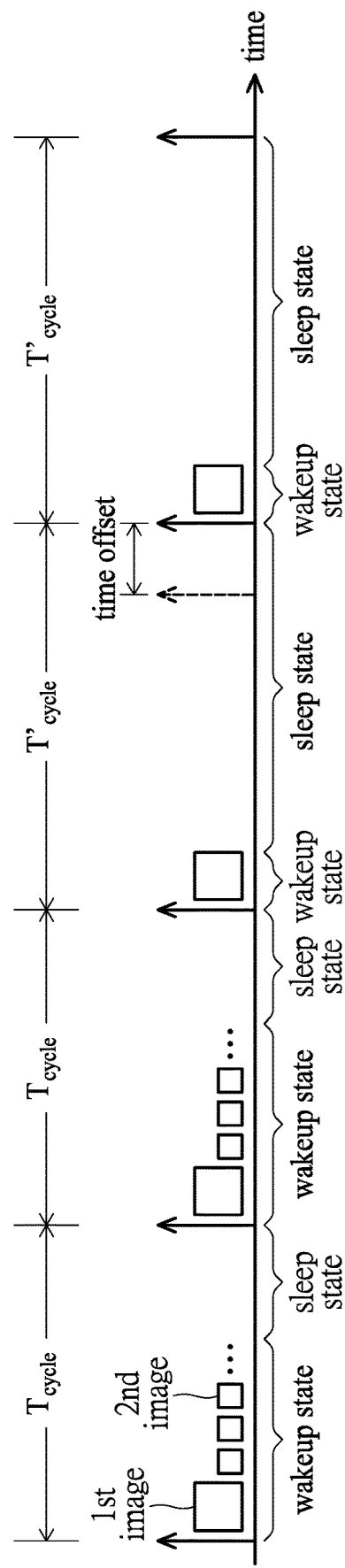
FIG. 3 shows a timing diagram composed of wakeup cycles, each of which includes a wakeup state followed by a sleep state.

In the embodiment, the motion detection system 100A performs motion detection in an automatic wakeup and sleep mode, as exemplified in FIG. 3 showing a timing diagram composed of wakeup cycles $T_{cycle}$, each of which includes a wakeup state followed by a sleep state.

In the embodiment, the motion detection system 100A may include an image sensor 11, such as a pixel array, configured to capture a first image for motion detection or capture a second image for flicker detection, where the second image has a resolution lower than the first image. In the embodiment, second images are captured in at least two consecutive wakeup cycles $T_{cycle}$ every predetermined number of wakeup cycles $T_{cycle}$, while first images are captured in every wakeup cycle $T_{cycle}$. The motion detection system 100A of the embodiment may include a controller 12 configured to control the image sensor 11 to output either the first image or the second image.

In the embodiment, the motion detection system 100A may include a motion detection device 13 coupled to receive the first image, and configured to perform motion detection on the first images, thereby outputting a detection result that is either motion detected or no motion detected.

The motion detection system 100A of the embodiment may include a flicker detection device 14 coupled to receive the second images, and configured to perform flicker detection on the second images. According to one aspect of the embodiment, the flicker detection device 14 may generate a time offset according to the second images, and the time offset may then be received by the controller 12 to update the wakeup cycle $T_{cycle}$ and accordingly to coordinate the image sensor 11 such that the motion detection system 100A may properly operate in the automatic wakeup and sleep mode without flicker.

Power consumption will always increase when using flicker detection in addition to motion detection. Lower flicker detection rate can minimize the increase amount. As the flicker detection operates at a rate lower than the motion detection, the additional power consumption due to flicker detection can be minimized. More importantly, the wakeup cycle $T_{cycle}$ is updated whenever flicker is detected, patterns of flicker banding for different frames are the same even when flicker frequency deviates, thereby inducing no false alarm due to flicker banding. Further, because there is no need for modification on motion detection in the embodiment, same motion detection sensitivity can be kept.

Figure 4A:
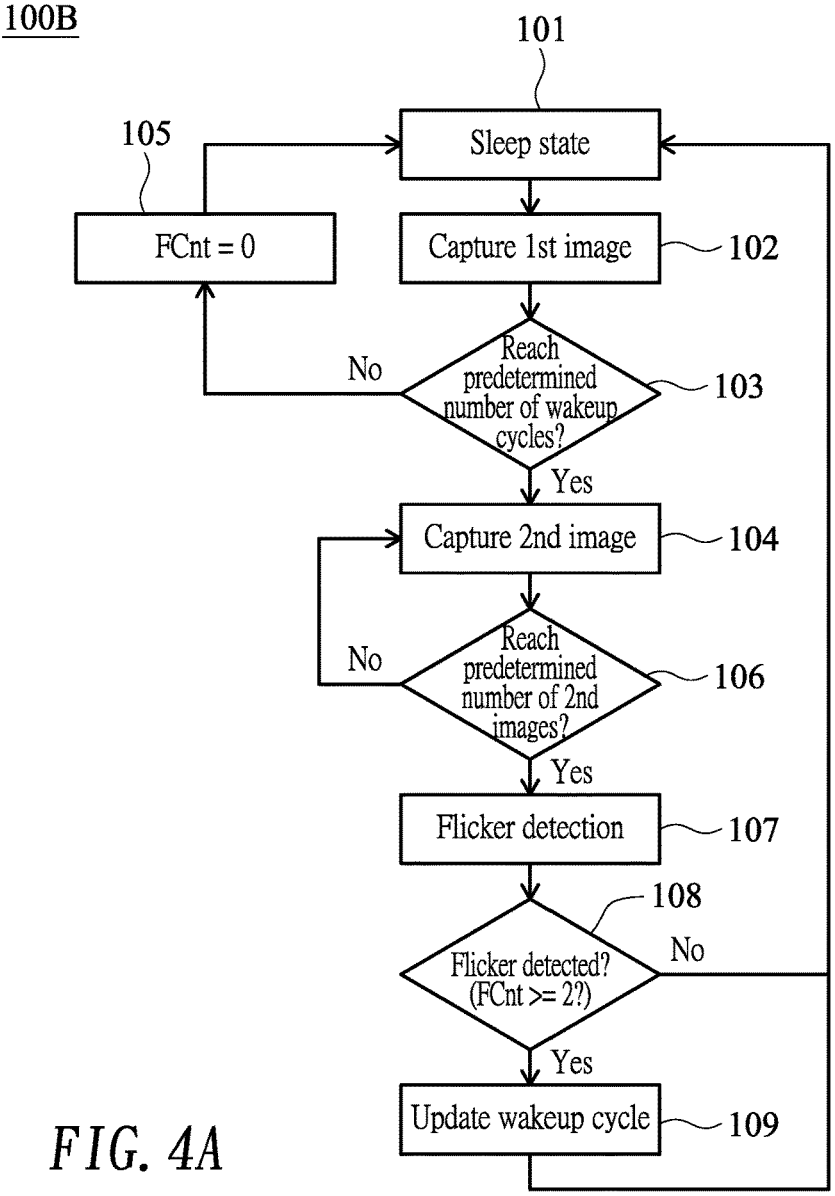
FIG. 4A shows a flow diagram illustrating a motion detection method with flicker compensation according to the first embodiment of the present invention.

FIG. 4A shows a flow diagram illustrating a motion detection method 100B with flicker compensation according to the first embodiment of the present invention.

Specifically, in step 101, the motion detection system 100A enters sleep state. Subsequently, in step 102, the image sensor 11 enters wakeup state to capture a first image for motion detection. In step 103, it is determined whether predetermined number of wakeup cycles $T_{cycle}$ have been reached. As stated above, second images are captured every predetermined number of wakeup cycles $T_{cycle}$ in the embodiment, and the second image is thus captured in step 104 if decision of step 103 is positive (indicating that the predetermined number of wakeup cycles $T_{cycle}$ have exhausted). Otherwise, the flow goes to step 105 to reset a flicker count FCnt, and then goes back to step 101. The second image is repetitively captured in step 104 until predetermined number of second images have been reached (step 106).

Next, in step 107, flicker detection is performed on the second images. Specifically speaking, there are two conditions to start flicker detection (capturing second images) in the present embodiment. First, start at every predetermined number of wakeup cycles, thereby making flicker detection run at a lower rate than motion detection (e.g., start flicker detection once for every ten wakeup cycles). Second, if flicker detection already starts (previous wakeup cycle captures second images), current wakeup cycle may also capture second images so that the flicker detection process (steps 104-109) runs for at least two consecutive wakeup cycles to obtain enough flicker phase information. (e.g., two out of ten wakeup cycles will capture second images).

Figure 4B:
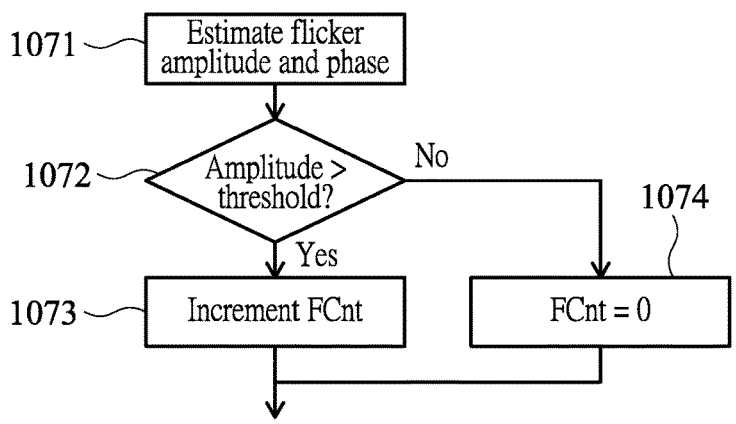
FIG. 4B shows a detailed flow diagram illustrating step 107 of FIG. 4A.

FIG. 4B shows a detailed flow diagram illustrating step 107 of FIG. 4A. As stated above, second images are captured in at least two consecutive wakeup cycles $T_{cycle}$ in the embodiment. For example, 16 second images are captured at a frame rate of 320 frames per second (fps). In step 1071, flicker amplitude and flicker phase are estimated. Specifically, in the embodiment, mean values of the captured second images are first obtained respectively, and the mean values are then subject to Fourier transform to obtain the flicker amplitude and the flicker phase at a flicker frequency. It is noted that the flicker frequency may be a frequency of rectified mains hum (e.g., 100 or 120 Hz), which is twice the frequency of alternating-current (AC) mains electricity (e.g., 50 or 60 Hz). Next, in step 1072, the flicker amplitude is compared with a predetermined threshold. If the flicker amplitude is larger than the threshold, the flicker count FCnt is incremented (step 1073), otherwise the flicker count FCnt is reset (step 1074). Details of flicker detection may be referred to JP 2012134677 entitled "IMAGING APPARATUS AND IMAGING METHOD," contents of which are incorporated herein by reference.

Referring back to FIG. 4A, in step 108, it is determined whether flicker is detected, for example, by comparing the flicker count FCnt with a predetermined threshold (e.g., 2). Flicker is detected if the flicker amplitude is larger than the predetermined threshold for at least two consecutive wakeup cycles $T_{cycle}$ (that is, FCnt>=2), and the flow goes to step 109. Otherwise, the flow goes back to step 101.

In step 109, a time offset is obtained to update the wakeup cycle $T_{cycle}$ in order to compensate flicker. Specifically, the time offset may be obtained according to phase difference (or shift) between two flicker phases that are obtained from two consecutive wakeup cycles $T_{cycle}$ respectively. The time offset $T_{offset}$ may be expressed as follows:

$$T_{offset}=(\psi_1-\psi_0)/(2*\pi*F_{flicker})$$

Where $\psi_1$ and $\psi_0$ are flicker phases obtained from two consecutive wakeup cycles $T_{cycle}$ respectively, and $F_{flicker}$ represents the flicker frequency.

The updated wakeup cycle $T'_{cycle}$ may be expressed as follows:

$$T'_{cycle}=T_{cycle}+T_{offset}$$

where $T_{cycle}$ represents an original (or current) wakeup cycle or a wakeup cycle before updating.

Figure 5:
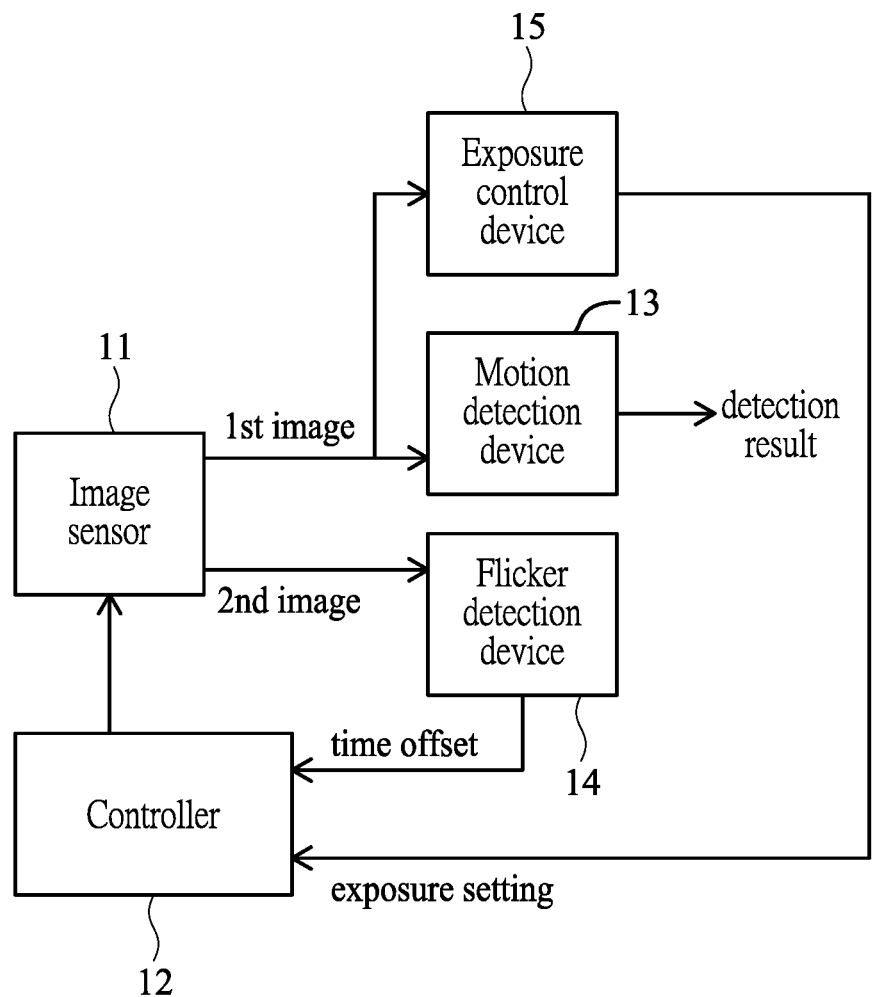
FIG. 5 shows a block diagram illustrating a motion detection system with flicker compensation according to a second embodiment of the present invention.

FIG. 5 shows a block diagram illustrating a motion detection system 200A with flicker compensation according to a second embodiment of the present invention. The motion detection system 200A as shown in FIG. 5 is similar to the motion detection system 100A of FIG. 2 except that the motion detection system 200A may further include an exposure control device 15 coupled to receive the first image, according to which an exposure setting (e.g., exposure time or gain) may be obtained and be fed to the controller 12. Accordingly, instead of capturing second images every predetermined number of wakeup cycles $T_{cycle}$ as in the first embodiment, the motion detection system 200A of the second embodiment starts capturing second images only when the exposure setting substantially changes (with a change that is greater than a predetermined threshold) and the exposure setting converges (indicating that there is an illumination change and the illumination flicker characteristics may also change correspondingly), and an exposure time is not equal to an integer multiple of an (illumination) flicker period. Alternatively speaking, capturing second image (and the associated flicker detection) is not needed (thereby reducing power consumption) when the illumination flicker characteristics are stable or the exposure setting does not substantially change.

Specifically speaking, there are four conditions to start flicker detection (capturing second images) in the present embodiment. First, exposure setting change, which may indicate illumination change. When illumination changes, its flicker characteristics may also change. Therefore, should be ready to start flicker detection. Second, exposure setting converge, which may indicate that the illumination change is over. The light intensity and flicker characteristics become stable. Therefore, start flicker detection after the converge can give more robust detection result. Third, run for at least two consecutive wakeup cycles. Fourth, exposure time is not equal to an integer multiple of a flicker period (e.g., shorter than one flicker period), which may indicate that there is flicker banding artifact on the first images for motion detection. Accordingly, start flicker detection only when there is flicker banding artifact.

Figure 6A:
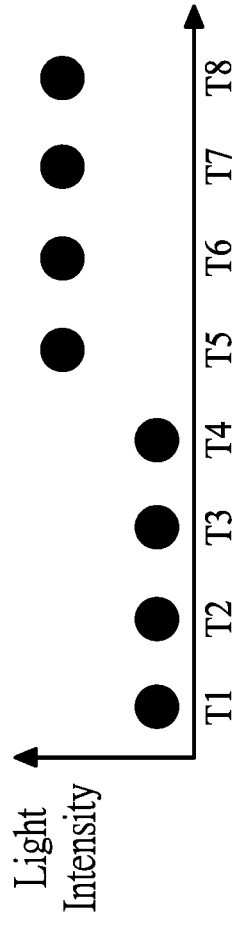
FIG. 6A, FIG. 6B and FIG. 6C show light intensity, mean and exposure setting versus wakeup cycles to illustrate an exposure setting convergence example.
Figure 6B:
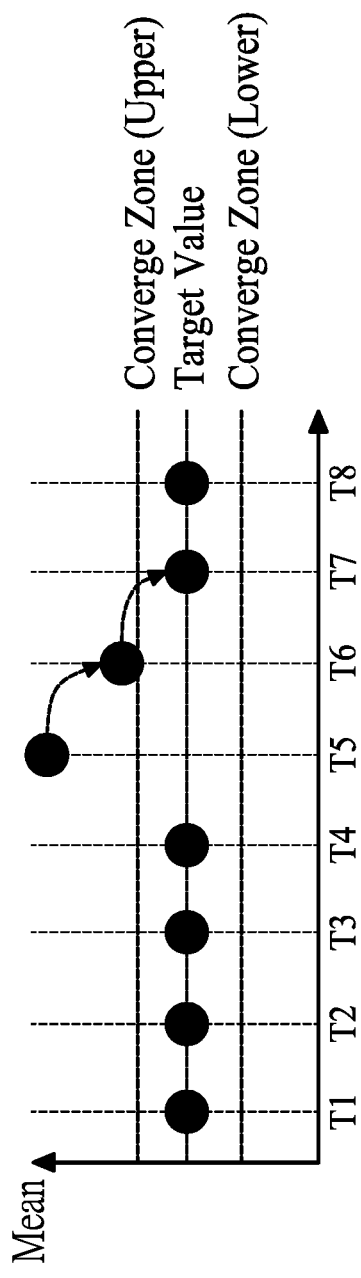
Figure 6C:
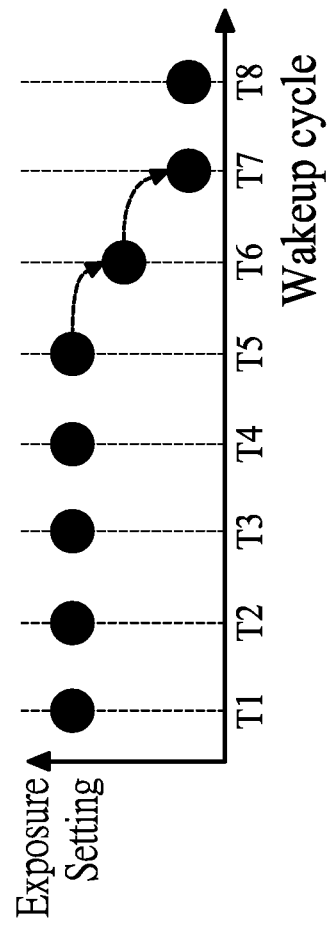

FIG. 6A, FIG. 6B and FIG. 6C show light intensity, mean and exposure setting versus wakeup cycles $T_{cycle}$ to illustrate an exposure setting convergence example. As exemplified in FIG. 6A, light intensity changes abruptly (for example, turning light on) at wakeup cycle T5. The mean as shown in FIG. 6B is then converging toward a target value. The exposure setting as shown in FIG. 6C converges at wakeup cycle T7, and the motion detection system 200A accordingly starts capturing second images and performing flicker detection.

Figure 7:
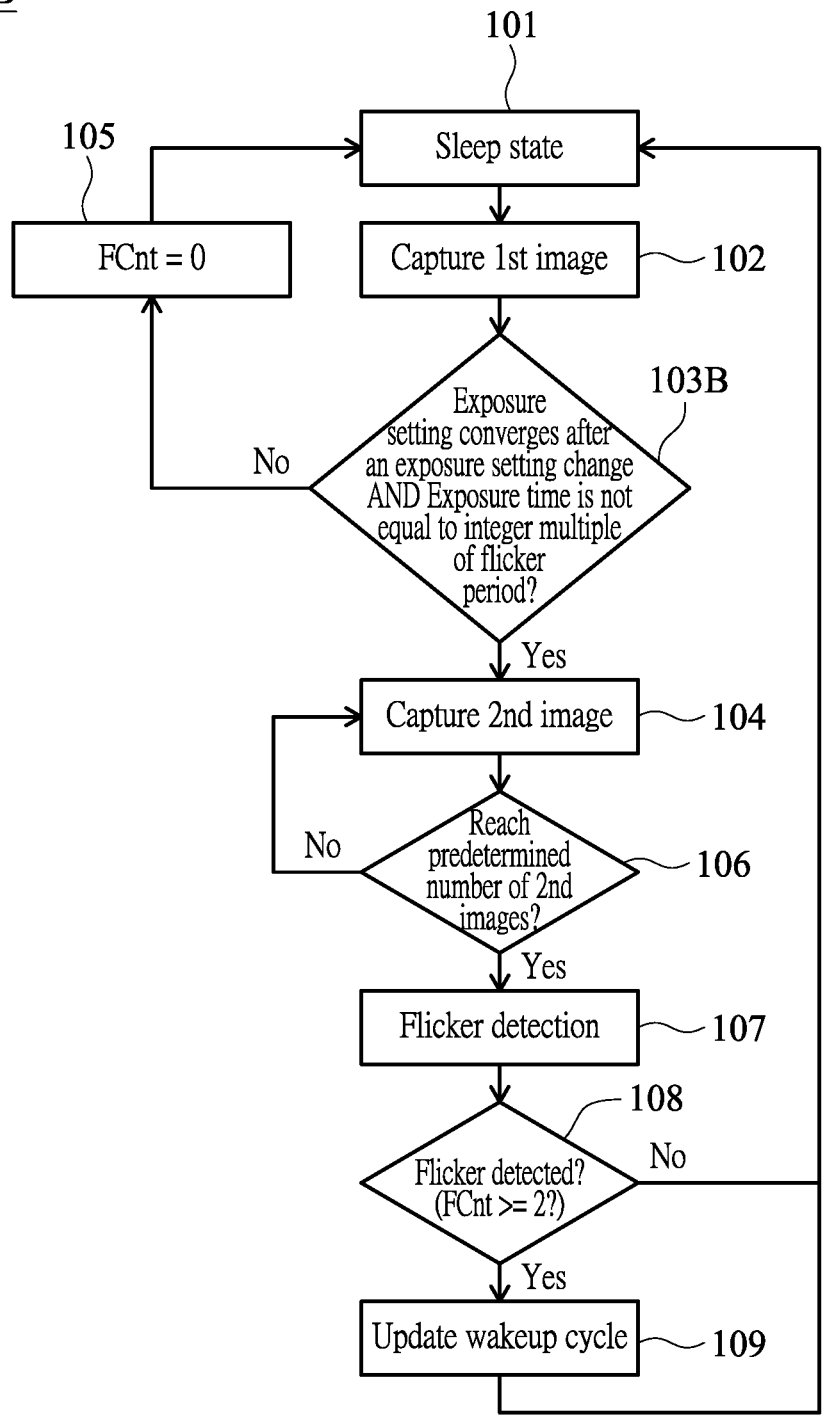
FIG. 7 shows a flow diagram illustrating a motion detection method with flicker compensation according to the second embodiment of the present invention.

FIG. 7 shows a flow diagram illustrating a motion detection method 200B with flicker compensation according to the second embodiment of the present invention. The motion detection method 200B as shown in FIG. 7 is similar to the motion detection method 100B of FIG. 4A except that step 103 of FIG. 4A is replaced with step 103B.

Specifically, in step 103B, an exposure setting (e.g., exposure time or gain) is obtained, and it is determined whether the exposure setting converges after an exposure setting change (indicating that there is an illumination change and the illumination flicker characteristics may also change correspondingly) and an exposure time is not equal to an integer multiple of an (illumination) flicker period. If decision of step 103B is positive, the flow goes to step 104 to capture second images. Otherwise, the flow goes to step 105 to reset a flicker count FCnt, and then goes back to step 101.

Although specific embodiments have been illustrated and described, it will be appreciated by those skilled in the art that various modifications may be made without departing from the scope of the present invention, which is intended to be limited solely by the appended claims.

What is claimed is:

1. A motion detection system with flicker compensation, comprising:
    an image sensor that captures a first image for motion detection and a second image for flicker detection, the second image having a resolution lower than the first image;
    a controller that controls the image sensor to output either the first image or the second image;
    a motion detection device that receives first images and performs motion detection on the first images; and
    a flicker detection device that receives second images and performs flicker detection on the second images to generate a time offset, which is fed to the controller to update a wakeup cycle for coordinating the image sensor;
    wherein the second images are captured in at least two consecutive wakeup cycles every predetermined number of wakeup cycles, while first images are captured in every wakeup cycle.

2. The system of claim 1, wherein the image sensor comprises a pixel array.

3. The system of claim 1, wherein the flicker detection operates at a rate lower than the motion detection.

4. The system of claim 1, wherein the flicker detection device performs the flicker detection with the following steps:
    obtaining mean values of the second images; and
    subjecting the mean values to Fourier transform to obtain a flicker amplitude and a flicker phase at a flicker frequency.

5. The system of claim 4, wherein the flicker frequency is twice a frequency of alternating-current (AC) mains electricity.

6. The system of claim 4, wherein flicker is detected if the flicker amplitude is larger than a predetermined threshold for at least two consecutive wakeup cycles.

7. The system of claim 4, wherein the time offset is equal to flicker phases difference divided by $(2*\pi*F_{flicker})$, where the flicker phases difference is a difference between flicker phases obtained from two consecutive wakeup cycles respectively, and $F_{flicker}$ represents the flicker frequency.

8. The system of claim 1, wherein an updated wakeup cycle is obtained by subtracting the time offset from a current wakeup cycle.

9. The system of claim 1, further comprising:
    an exposure control device that receives the first image, according to which an exposure setting is obtained and fed to the controller.

10. The system of claim 9, wherein the second image is captured only when the exposure setting substantially changes with a change that is greater than a predetermined threshold and the exposure setting converges, and exposure time of the exposure setting is not equal to an integer multiple of a flicker period.

11. The system of claim 10, wherein the exposure setting comprises the exposure time and gain.

* * * * *